UNITED STATES PATENT OFFICE.

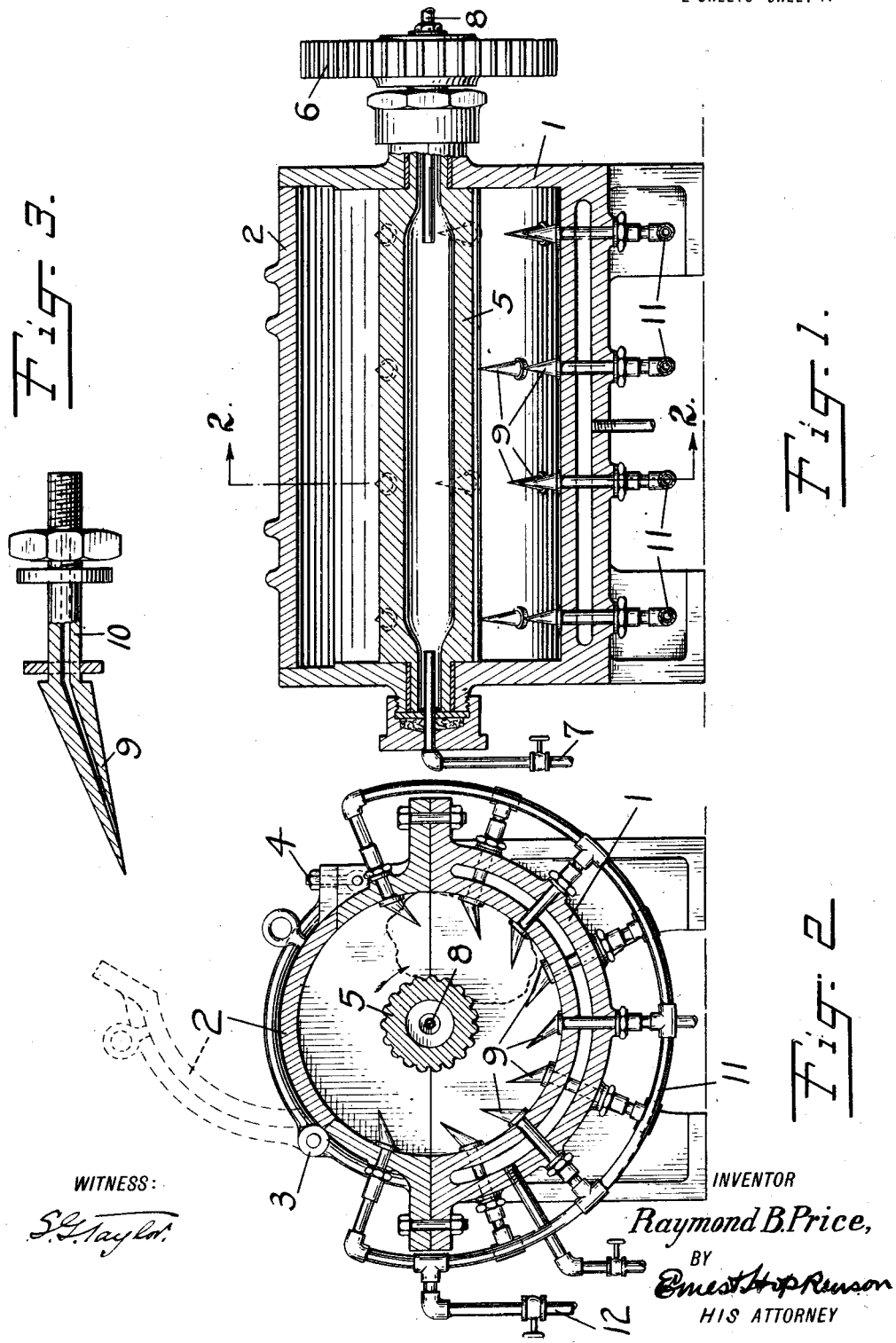

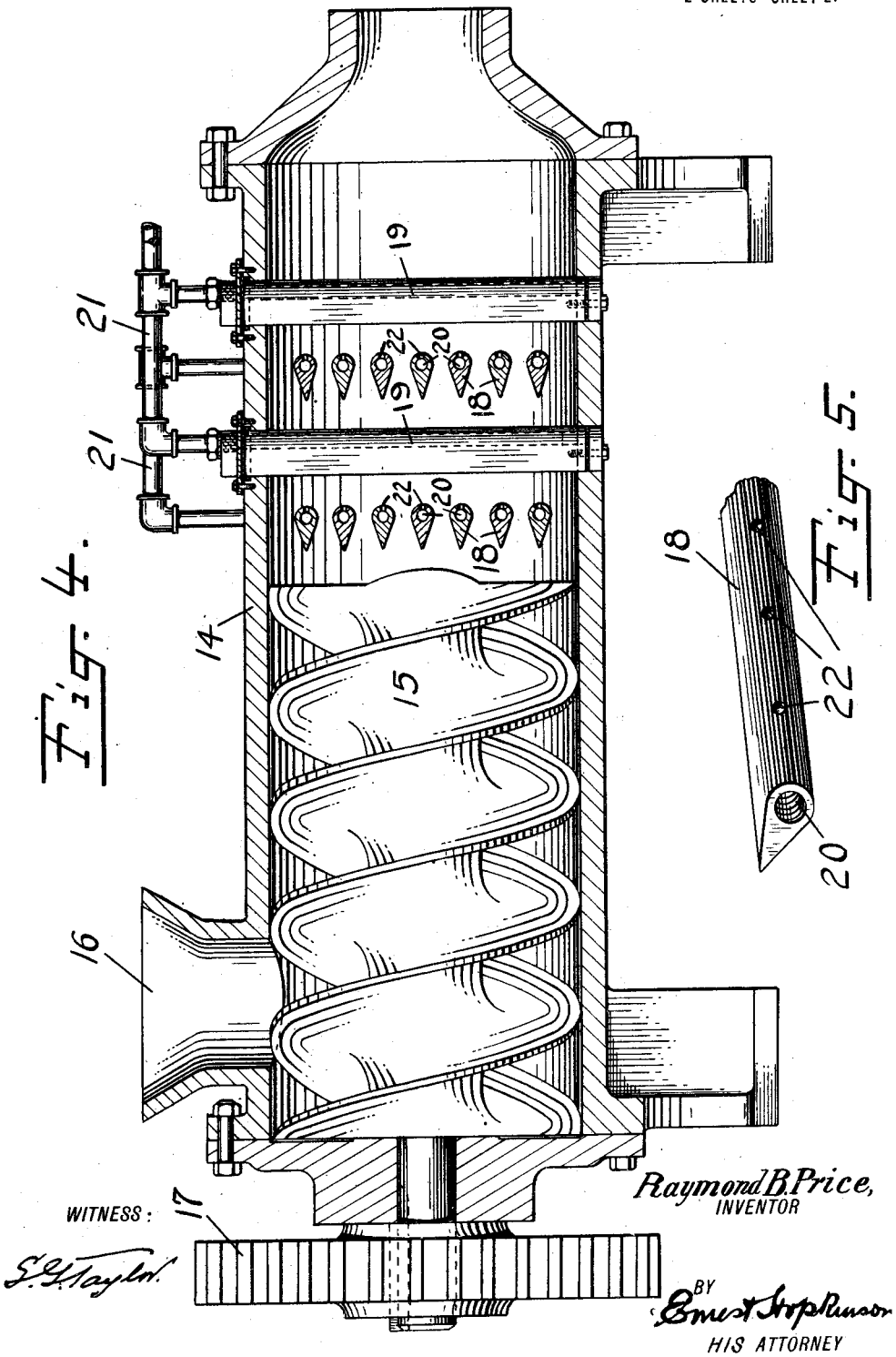

RAYMOND B. PRICE, OF NEW YORK, N. Y., ASSIGNOR TO RUBBER REGENERATING COMPANY, A CORPORATION OF INDIANA.

APPARATUS FOR TREATING PLASTIC MATERIALS.

1,184,016.  Specification of Letters Patent.  Patented May 23, 1916.

Application filed November 12, 1915. Serial No. 61,038.

*To all whom it may concern:*

Be it known that I, RAYMOND B. PRICE, a citizen of the United States, residing in the city of New York, county and State of New York, have invented certain new and useful Improvements in Apparatus for Treating Plastic Materials, of which the following is a full, clear, and exact description.

My invention relates to apparatus for removing entrapped gases, liquids, etc., from plastic materials during the process of preparation for other uses, such as in the preparation of rubber stock previous to vulcanizing the same.

The object of my invention is to provide an improved apparatus through the use of which the vacuum may be more efficiently and completely applied to the material being treated to remove all of the entrained or entrapped gases, liquids, etc. This is accomplished in accordance with my invention by puncturing or dividing material at a large number of independent points and applying a vacuum directly to the material where the punctures or divisions are made.

The above object may be accomplished in a variety of ways, but for the purpose of illustration I have shown in the accompanying drawings two such ways of accomplishing the application of vacuum in the manner referred to.

For a detailed description of two forms of my invention, reference may be had to the following specification and to the accompanying drawings forming a part thereof, in which:

Figure 1 is a longitudinal sectional view of an apparatus in which the rubber is divided by a series of hollow pins or needles through which the vacuum acts. Fig. 2 is a transverse sectional view thereof. Fig. 3 is a detail view, partly in section, of one of the hollow pins or needles. Fig. 4 is a longitudinal sectional view of a modified form of the device. Fig. 5 is a perspective view of a detail of one of the knives or wedges employed with the form of the device shown in Fig. 4.

Referring to the drawings, the numeral 1 indicates a suitable casing jacketed to provide heating or cooling, if necessary, said casing being provided with a hinged cover 2 which is adapted to be retained in position in any well known way, as by the use of hinges 3 and bolts 4. The numeral 5 indicates a hollow corrugated cylinder or roll within the casing 1 which is caused to rotate in any suitable manner, as by the gear 6 attached to one of the journals thereof. The journals of the roll 5 are also hollow and are connected with pipes 7 and 8 through which steam or any other heating or cooling fluid may be introduced to the space within the roll 5. The apparatus thus far described is a well known form of device for treating plastic material, and is termed a "masticator", the rotation of the roll causing the plastic material to assume the form of a soft ball or dough-like mass which is kneaded and worked by the roll as it rotates.

On the inner surface of the casing 1 I provide a multiplicity of needles or hollow pins 9 which have outwardly extending tubular portions 10 projecting from the outside of the casing 1 so as to be attached to a series of tubes or pipes 11 for the purpose of producing a vacuum at the ends of the needles 9. These pipes 11 are all connected to a common source of vacuum, such as by the main supply pipe 12. The needles 9 preferably have the passage therethrough terminating at a point slightly removed from the ends, and the orifice thereby formed is located on the rear side of the needles or that side opposite to the side with which the material contacts as it advances.

It will now be seen, as indicated in Fig. 2, that as the roll 5 rotates, the material between the roll and the inner side of the casing will be kneaded and worked and at the same time the needles 9 will penetrate the mass and reach all portions of its interior, the suction acting at the same time to withdraw all entrapped fluids, gases, etc.

In Fig. 4 I have shown my invention applied to what is known as a tubing machine. In this figure the numeral 14 indicates a suitable cylindrical casing having a hopper 16 communicating therewith. Located within the casing 14 is a feed screw or worm 15 driven by a suitable gear or other device 17. Located transversely of the casing 14 within the same are a plurality of series of wedge-shaped bars 18 and 19, one-half of the bars preferably running horizontal and the other half vertical. These bars are hollow or are provided with passages therein, as indicated by 20. The passages communicate with a large number of small orifices 22 which open outwardly on the larger end of the wedge-shaped bars 18 and 19. The passages 20 are connected with suitable external pipes 21 which are in turn connected with a suitable source of vacuum or reduced air pressure.

In this form of the device it will be seen that as the plastic material is forced toward the right in Fig. 4, the same will be cut or split up into numerous small portions and at the same time a vacuum will act on the material as it passes the rear end of the wedges. The wedge-shaped bars may be made as numerous as is necessary or convenient, and of any size that is suitable for the material being treated.

I do not wish to be understood as being limited to the details of form and arrangement of parts herein set forth, for various changes may be made by those skilled in the art without departing from the spirit and scope of my invention.

What I claim and desire to protect by Letters Patent is:

1. In a device for treating plastic material, means for causing progressive movement of said material, and a series of projecting parts having passages therethrough and arranged to penetrate said material, and means connecting said passages with the external air.

2. In a device for treating plastic materials, a series of tapering projections adapted to penetrate said materials, and having passages therein, and a source of reduced air pressure connected with said passages.

3. In a device for treating plastic materials, means for causing a progressive movement of said material, a series of sharp projections located in the path of said material and having passages therethrough, said passages having openings to the exterior of said projections on the rear side thereof relative to the movement of said material, and means connecting said passages with a suitable source of vacuum.

4. In a device for treating vulcanizable plastics, the combination of a hollow member having an opening communicating with the hollow portion and adapted to penetrate the plastic at said opening, and means adapted to effect the penetration of the material by said member and for compressing the material during said penetration.

Signed this 30th day of October, 1915.

RAYMOND B. PRICE.

Copies of this patent may be obtained for five cents each, by addressing the "Commissioner of Patents, Washington, D. C."